United States Patent Office 3,328,261
Patented June 27, 1967

3,328,261
METHOD FOR THE FERMENTATIVE PRODUCTION OF 5-AMINO-4-IMIDAZOLE CARBOXAMIDE RIBOTIDE
Kiyoshi Nakayama, Sagamihara-shi, and Haruo Tanaka, Tokyo, Japan, assignors to Kyowa Hakko Kogyo Co., Ltd., Chiyoda-ku, Tokyo, Japan, a corporation of Japan
No Drawing. Filed Feb. 19, 1965, Ser. No. 434,114
Claims priority, application Japan, Feb. 24, 1964, 39/9,264
9 Claims. (Cl. 195—28)

The present invention is concerned with the production of 5-amino-4-imidazole carboxamide ribotide, hereinafter referred to as AICAR. This compound which corresponds to the formula

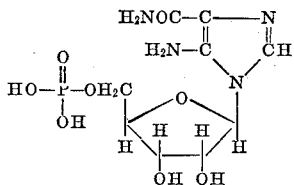

is important as an intermediate in the biosynthesis of nucleic acid and derivatives thereof.

The primary object of this invention is the development of a commercially feasible, i.e low cost and high yield, method for the production of AICAR. Briefly stated, this object is realized by the expedient of effecting fermentation of a 5-amino-4-imidazole carboxamide-containing, fermentable nutrient medium utilizable by *Brevibacterium ammoniagenes* microorganisms for the conversion of the said carboxamide into the corresponding ribotide AICAR. The 5-amino-4-imidazole carboxamide can be added to the culture medium at any stage of the fermentation process, i.e. at the beginning or during the progress thereof.

The medium itself, except for the presence of the 5-amino-4-imidazolecarboxamide, is of the type and composition normally employed for the culture of *Brevibacterium ammoniagenes*. Thus, use can be made of media which contain conventionally appropriate amounts of carbohydrates or other carbon sources (glucose, starch hydrolysates, molasses, etc.), nitrogen sources (urea, ammonium chloride, ammonium nitrate, etc.), inorganic compounds (potassium phosphate, magnesium sulfate, calcium chloride, etc.), natural substances with nitrogen (corn steep liquor, yeast extract, meat extract, peptone, fish meal, etc.). When use is made of a *Brevibacterium ammoniagenes* strain with a specific nuitritional requirement, the appropriate nutrient to satisfy the growth requirement is added to the culture medium. The 5-amino-4-imidazole carboxamide, which must be present in the culture medium according to the present invention, is added to the medium—composed as precedingly indicated—all at one time at the beginning or during the course of the fermentation.

The fermentation itself proceeds in manner per se conventional for the culture of *Brevibacterium ammoniagenes*, i.e. is carried out aerobically, by submerged or shaking culture, at a temperature of 20° to 40° C. at a pH of 5.5 to 9.0 and until there is a maximum accumulation of AICAR in the fermentation broth, usually for a period of about 2 to 8 days.

Upon completion of the fermentative conversion of the 5-amino-4-imidazole carboxamide into AICAR, the latter is recovered from the fermentation broth by any of the well-known and per se conventional methods for recovering fermentative conversion products, i.e by an ion exchange resin adsorption method, precipitation method, extraction method, etc.

The following is an illustrative but non-limitative example of a presently preferred embodiment of the invention. Parts by weight bear the same relation to parts by volume as do grams to milliliters. Percentages are by weight unless otherwise indicated.

EXAMPLE 1

*Brevibacterium ammoniagenes* (ATCC 6872) is inoculated into a culture medium consisting of

| | | |
|---|---|---|
| Glucose | percent | 2 |
| Peptone | do | 1 |
| Yeast extract | do | 1 |
| NaCl | do | 0.3 |
| and | | |
| Biotin | μg. (gammas) | 30 |

Remainder water, ad. 1 liter.

and incubation allowed to proceed at 30° C. for 24 hours.

Ten percent by volume of the thus obtained inoculum is inoculated into fermentation medium of the composition:

| | | |
|---|---|---|
| Glucose | grams | 100 |
| Urea | do | 6 |
| $K_2HPO_4$ | do | 10 |
| $KH_2PO_4$ | do | 10 |
| $MgSO_4 \cdot 7H_2O$ | do | 10 |
| $CaCl_2 \cdot 2H_2O$ | do | 0.1 |
| Yeast extract | do | 10 |
| and | | |
| Biotin | μg. (gammas) | 30 | per liter of water. The pH of the medium is adjusted to 8.0 with NaOH. [Note: Sterilization of the fermentation medium is preliminarily carried out in a pressurized sterilizer (1 kg./cm.²) for 10 minutes.]

Submerged aerobic culture is carried out at 30° C. This may be carried out, if desired, in 250 milliliter flasks each containing 20 milliliters of the fermentation medium inoculated as precedingly described. It may equally well be carried out on a large scale according to which, for example, a liter or more of inoculated fermentation medium is subjected to the submerged aerobic treatment in a correspondingly large receptacle provided with stirring devices, heaters, etc.

After 72 hours' culture, 5-amino-4-imidazole carboxamide is added to the fermentation liquor in such amount as to be present in the latter in a concentration of 1 milligram per milliliter (1 gram per liter). Culturing is continued as before for 24 more hours. As a result, 0.68 milligram per milliliter (0.68 gram per liter) of AICAR is accumulated in the fermentation liquor.

The so-produced AICAR is isolated from the reaction mixture in any suitable and per se conventional manner, the particular mode of isolation not being per se part of the present invention. AICAR is a known compound and has heretofore been recovered from reaction mixtures containing the same.

EXAMPLE 2

The same procedure as in Example 1 is carried out except that as the microorganism used *Brevibacterium ammoniagenes* ATCC 6871, 15750, 15751 instead of *Brevibacterium ammoniagenes* ATCC 6872 used in Example 1. The amount of AICAR accumulated after cultivating for 96 hrs. is shown in Table 1 below.

Table 1

| Brevibacterium ammoniagenes: | AICAR accumulated, mg./ml. |
|---|---|
| ATCC 6871 | 0.67 |
| ATCC 15750 | 0.70 |
| ATCC 15751 | 0.65 |

What is claimed is:

1. A fermentative process for the production of 5-amino-4-imidazole carboxamide ribotide which comprises culturing *Brevibacterium ammoniagenes* under aerobic conditions in an aqueous nutrient medium containing 5-amino-4-imidazole carboxamide whereby fermentative conversion of the latter into 5-amino-4-imidazole carboxamide ribotide takes place, and continuing the conversion until significant quantities of the latter have been produced.

2. A process according to claim 1 wherein the culturing is effected under submerged aerobic conditions.

3. A process according to claim 1 wherein the microorganism is *Brevibacterium ammoniagenes* ATCC 6872.

4. A process according to claim 1 wherein the microorganism is *Brevibacterium ammoniagenes* ATCC 6871.

5. A process according to claim 1 wherein the microorganism is *Brevibacterium ammoniagenes* ATCC 15750.

6. A process according to claim 1 wherein the microorganism is *Brevibacterium ammoniagenes* ATCC 15751.

7. In a process for the culturing of *Brevibacterium ammoniagenes* aerobically in an aqueous nutrient medium containing carbon and nitrogen sources, the improvement of introducing 5-amino-4-imidazole carboxamide into said medium at any stage of the culturing period whereby conversion of the said 5-amino-4-imidazole carboxamide into 5-amino-4-imidazole carboxamide ribotide takes place, and continuing the culturing until substantial quantities of said ribotide have accumulated.

8. The improvement according to claim 7, wherein said 5-amino-4-imidazole carboxamide is present in said nutrient medium from the beginning of the culturing period.

9. The improvement according to claim 7, wherein the 5-amino-4-imidazole carboxamide is introduced into the nutrient medium after culturing has continued for a considerable period of time in the absence of 5-amino-4-imidazole carboxamide, and thereafter continuing said culturing until substantial quantities of 5-amino-4-imidazole carboxamide ribotide have accumulated.

No references cited.

A. LOUIS MONACELL, *Primary Examiner.*

A. E. TANENHOLTZ, *Assistant Examiner.*